Patented Jan. 3, 1933

1,893,438

UNITED STATES PATENT OFFICE

ALFRED OBERLE, OF WASHINGTON, DISTRICT OF COLUMBIA, ASSIGNOR OF ONE-HALF TO THOMAS E. SCOFIELD, OF KANSAS CITY, MISSOURI

METHOD OF PURIFYING PETROLEUM HYDROCARBONS

No Drawing. Application filed March 11, 1926, Serial No. 94,052. Divided and this application filed July 29, 1931. Serial No. 553,883.

This invention relates to improvements in a method for purifying petroleum hydrocarbons, and refers more particularly to a method for decolorizing, deodorizing and otherwise purifying hydrocarbon oils such as distillates, refined or unrefined, cracked oils, and within its scope the invention encompasses any type of petroleum hydrocarbons.

This invention is a continuation in part of an application Serial No. 753,345, filed December 1st, 1924, and a division of an application Serial No. 94,052, filed March 11th, 1926.

Among the objects of the invention are, to provide a method in which petroleum hydrocarbons are purified with a halogen, preferably iodine, this material being used in the purification of the oil as a water-soluble material or in a water solution or partially so; to provide a process in which a halogen such as iodine is made watersoluble and the solution used for the purification of the oil while the latter is either in the liquid or vapor phase as may also be the purifying material; to provide a process which effectively removes from hydrocarbon oils objectionable impurities, permanently decolorizing the oil and eliminating sulphur compounds and other impurities tending to effect the marketability of the ultimate product; to provide a process which, in addition to its purifying qualities, lends to the purified oil improved characteristics in the way of producing the material which has improved qualities when used as a motor fuel particularly with reference to its anti-knock properties, and, in general, to provide a process hereinafter described in more detail.

While the halogen is adaptable for the purification of any type of hydrocarbon material, it is particularly adapted to those petroleum distillates which result from the pressure decomposition or cracking of oils,—such oils being particularly objectionable as to odor, color and their gum forming properties.

It has been found that distillate, such as above mentioned and particularly lighter oils recovered from petroleum by pressure distillation, are very apt to go off color by exposure to light. This tendency is particularly noticeable where is exposed in visible pumps, to sunlight, or artificial light.

Numerous methods and processes have been attempted to eliminate the objectionable characteristics of cracked distillates in the way of steam distillation, acid and caustic treatments, or treatment with sulphur dioxide, sodium plumbite, fuller's earth, charcoal fillers, silica gel, etc. All of these processes are more or less effective, but most of them are particularly objectionable due to the waste or loss which attends the purifying treatment.

It has been found that, when a distillate is treated or washed with an aqueous solution containing iodine, the distillate, upon exposure to conditions which would normally tend to cause it to go off color, has this characteristic offset by the treatment to the extent that it may stand indefinitely while being subjected to such conditions without discoloration. There is a gravitational separation which takes place, leaving the purified oil easily separable from the purifying material. After separation from the aqueous iodine solution, the distillate is filtered, at which time the color is substantially removed. With a subsequent water wash, the resulting product is found to be waterwhite, odorless and sweet, and remains so. The aqueous solution containing iodine separated from the treated oil may be roused in the form in which it is recovered or after undergoing a purifying treatment to eliminate the impurities gathered from the oil. It has been found from actual experimentation that this treatment in the presence of sunlight, artificial light or in the presence of ultraviolet rays, is perceptibly activated and improved.

These iodine compounds may be used as a purifying material in the form of solids or mixtures of solids, also as liquids or mixtures of liquids,—an example of which would be iodine in solution with a liquid other than water or with water. Further methods of combination are in the form of aqueous solution containing iodine as previously described, or mixtures of aqueous solutions containing iodine. Either of the above methods of treating with iodine may be used to treat the oil either in the liquid or in the vapor phase, depending primarily upon the temperature of treatment. The period of treatment or the time factor necessary to produce the treatment desired will depend to a great extent upon the character of the oil undergoing treatment and the particular iodine compound used. Under certain conditions, also, it has been found to improve the method of treatment by using pressure above atmospheric, and in other cases the process is rendered more effective by the use of a vacuum. Normal treatment may be produced at atmospheric conditions. It has been found that the iodine treatment gives certain characteristic colors with different types of oils, i. e., different types of oils treated with the same purifying material will give different characteristic colors. Likewise, different iodine compounds when treating the same oil may give different characteristic colors, the colors ranging from a light yellow to a dark blue violet,—depending upon the iodine compound utilized or upon the characteristic oil being treated and also more or less upon the degree of exposure to light.

The normal treatment of petroleum distillates for purification has a tendency to remove from the oil certain desirable characteristics in the oil which have a tendency to improve its anti-knock qualities. As contrasted with this normal treatment, the iodine treatment herein described has an opposite tendency, i. e., it improves the anti-knock qualities in place of diminishing such properties in the oil. In this connection it is of interest to note that the coloring in some of the treated oils has a direct bearing or relation upon its anti-knock properties. Where it is of importance to procure a motor fuel having improved anti-knock properties, it may be advisable to somewhat restrict the elimination of color as under certain conditions the producing of a waterwhite product may, to a more or less extent, diminish the anti-knock properties.

Among the compounds of iodine adaptable to this purifying treatment are those of: potassium, magnesium, sodium, manganese, ammonium, mercury, barium, nickel, strontium, rubidium, lead, silver, calcium, tellurium, cadmium, tin, copper, zinc.

Some of these compounds are especially adaptable. Each of these substances in combination with iodine has its charcteristics solubility which may be increased or decreased by the addition and combination with other substances. Thus, potassium iodide and iodoeosin are readily water soluble, while mercuric iodide is relatively insoluble but is rendered easily soluble by the addition of potassium iodide or calcium iodide thereto. In the same manner other compounds such as iodide compound of lead which is relatively insoluble, having a solubility of about .099 parts in 100 parts of water at substantially 30 degrees C., is rendered about ten times as soluble by the compounding therewith of potassium iodide. In the same manner, other compounds may be improved as to their solubility and action as a purifying material.

A characteristic treatment of oil in the vapor phase would be to bubble the hydrocarbon vapors through an aqueous solution of the purifying material which may contain glass wool, glass beads, steel wool or other material which insures intimate contact between the vapors and purifying solution. In the liquid phase, the purifying solution is combined and intimately mixed by agitation so as to distribute or thoroughly commingle the purifying solution and the oil. Where it is found advantageous to have both the purifying material and the oil in the vapor phase, any of the well known methods of mixing and subsequent separation by gravitational separation and condensation may be adapted. Counterflow methods are also effective in this connection.

I claim as my invention:

1. A process for altering the characteristics of cracked petroleum hydrocarbons in the way of purification and improving their anti-detonating properties comprising the steps of treating the cracked oil with an aqueous solution of iodine.

2. A process for altering the characteristics of cracked petroleum hydrocarbons in the way of purification and improving their anti-detonating properties comprising the steps of treating the cracked oil with an aqueous solution of iodine and separating from the oil any excess of the treating material.

3. A process for altering the characteristics of cracked petroleum hydrocarbons in the way of purification and improving their anti-detonating properties comprising contacting the hydrocarbons in vapor-phase with an aqueous solution of iodine.

4. A process for altering the characteristics of cracked petroleum hydrocarbons in the way of purification and improving their anti-detonating properties comprising the steps of treating the oil in the vapor-phase with an aqueous solution of iodine and separating from the oil the treating material insoluble in the hydrocarbons.

5. A process for altering the characteristics of cracked petroleum hydrocarbons in the way of purification and improving their anti-detonating properties comprising the steps of treating the oil in the vapor-phase with iodine in aqueous solution and separating from the oil any excess of the treating material.

ALFRED OBERLE.